(12) United States Patent
Cavanaugh (10) Patent No.: US 8,512,111 B2
(45) Date of Patent: Aug. 20, 2013

(54) VEHICLE COWL BOX STRUCTURE

(75) Inventor: Sean Cavanaugh, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 1186 days.

(21) Appl. No.: 12/202,618

(22) Filed: Sep. 2, 2008

(65) Prior Publication Data

US 2010/0052364 A1    Mar. 4, 2010

(51) Int. Cl.
*B60H 1/30* (2006.01)

(52) U.S. Cl.
USPC ........................................... 454/146

(58) Field of Classification Search
USPC ................. 454/145, 69, 143, 147, 148, 149, 454/141, 333
See application file for complete search history.

(56) References Cited

U.S. PATENT DOCUMENTS

| 3,506,038 A | * | 4/1970 | Perry et al. ................ 138/45 |
| 4,523,715 A | | 6/1985 | Ohsawa et al. |
| 6,089,971 A | * | 7/2000 | Jokela et al. .............. 454/127 |
| 7,037,187 B2 | * | 5/2006 | Butera et al. .............. 454/76 |
| 2008/0108291 A1 | * | 5/2008 | Biasiotto et al. .......... 454/69 |

FOREIGN PATENT DOCUMENTS

JP    10324282 A   * 12/1998

* cited by examiner

*Primary Examiner* — Steven B McAllister
*Assistant Examiner* — Brittany E Towns
(74) *Attorney, Agent, or Firm* — Global IP Counselors, LLP (57) ABSTRACT

A vehicle cowl box structure is provided basically with an air inlet, an air outlet, an air passageway and a flow restriction device. The air inlet is arranged to receive outside air. The air outlet is arranged to convey the outside air to a vehicle HVAC system. The air passageway extends between the air inlet and the air outlet to convey the outside air from the air inlet to the air outlet. The flow restriction device is disposed in the air passageway at a point between the air inlet and the air outlet. The flow restriction device is configured and arranged to automatically decrease airflow from the air inlet to the air outlet as the airflow through the air inlet increases.

15 Claims, 7 Drawing Sheets

VEHICLE COWL BOX STRUCTURE

BACKGROUND OF THE INVENTION

1. Field of the Invention

The present invention generally relates to a vehicle cowl box structure. More specifically, the present invention relates to regulating air flow through a vehicle cowl box structure to a vehicle HVAC system.

2. Background Information

For many years, automotive vehicles have been provided with climate control systems (e.g., heating, ventilating and air conditioning (HVAC) systems) in order to provide a more comfortable environment for the driver and any passengers. Typically, fresh air is supplied to the HVAC system via ducts extending from a cowl box structure of the vehicle. Generally, the cowl box structure is a structure that is disposed in an area between a front windshield and a fire wall of an engine room. The cowl box structure usually has an upward opening with air inlets that have louvers. The air inlets of the cowl louver are provided so that outside air is drawn into the cowl box structure. The air drawn into the cowl box structure is then used for the air conditioning and/or directly sent to the vehicle interior through a duct coupling the cowl box structure and the vehicle interior.

At higher vehicle speeds, a "ram air effect" occurs on the air inlet of the cowl box structure due to the increasing airflow volume being forced into the cowl box structure at increasing vehicle speeds. In vehicle HVAC systems that have automatic variable blower control (VBC), the "ram air effect" can be compensated for by modulating blower speed directly. However, in lower cost HVAC systems without automatic variable blower control (VBC), the "ram air effect" that occurs on the air inlet of the cowl box structure can cause an undesirable air rush noise in the cabin of the vehicle.

In view of the above, it will be apparent to those skilled in the art from this disclosure that there exists a need for an improved vehicle cowl box. This invention addresses this need in the art as well as other needs, which will become apparent to those skilled in the art from this disclosure.

SUMMARY OF THE INVENTION

It has been discovered that one problem that can arise with a typical cowl box structure is that at higher vehicle speeds, ram inlet airflow from the cowl box to the air handling portion of the HVAC system can cause unintended increase of airflow volume and air rush noise in the cabin of the vehicle.

In view of the state of the known technology, one object of the present invention is to provide a cowl box structure that reduces the ram air effect without using automatic variable blower control (VBC).

In accordance with one aspect of the present invention, a vehicle cowl structure is provided that basically comprises an air inlet, an air outlet, an air passageway and a flow restriction device. The air inlet is arranged to receive outside air. The air outlet is arranged to convey the outside air to a vehicle HVAC system. The air passageway extends between the air inlet and the air outlet to convey the outside air from the air inlet to the air outlet. The flow restriction device is disposed in the air passageway at a point between the air inlet and the air outlet. The flow restriction device is configured and arranged to automatically decrease airflow from the air inlet to the air outlet as the airflow through the air inlet increases.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
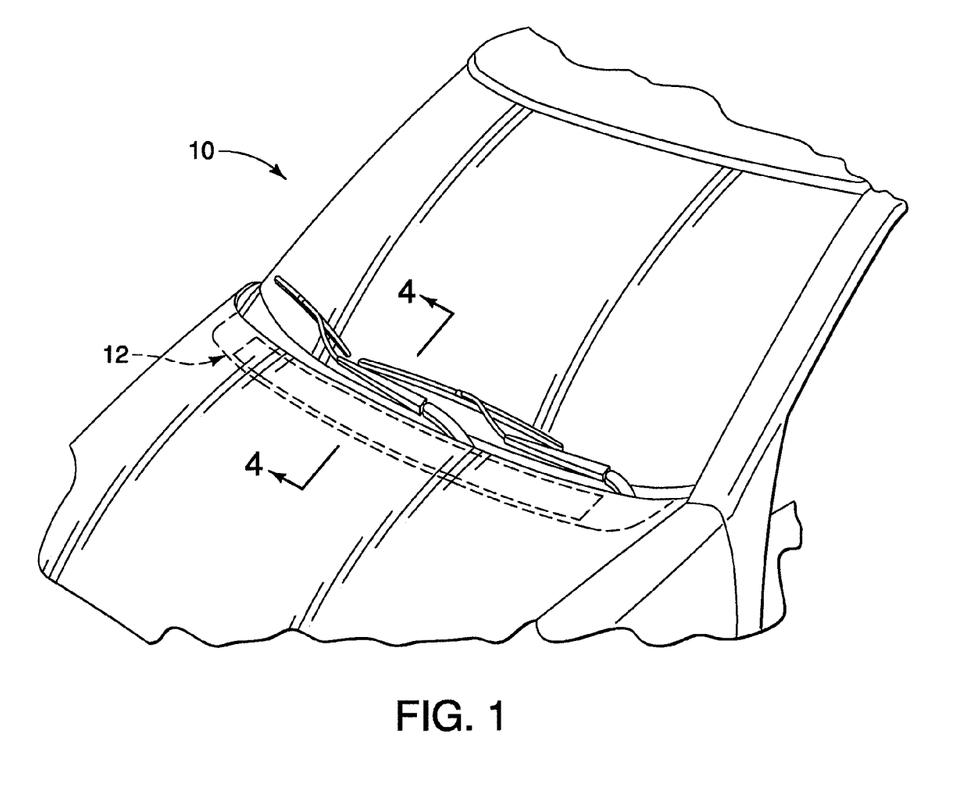
FIG. 1 is a partial front perspective view of a vehicle equipped with a cowl box structure in accordance with the present invention.
Figure 2:
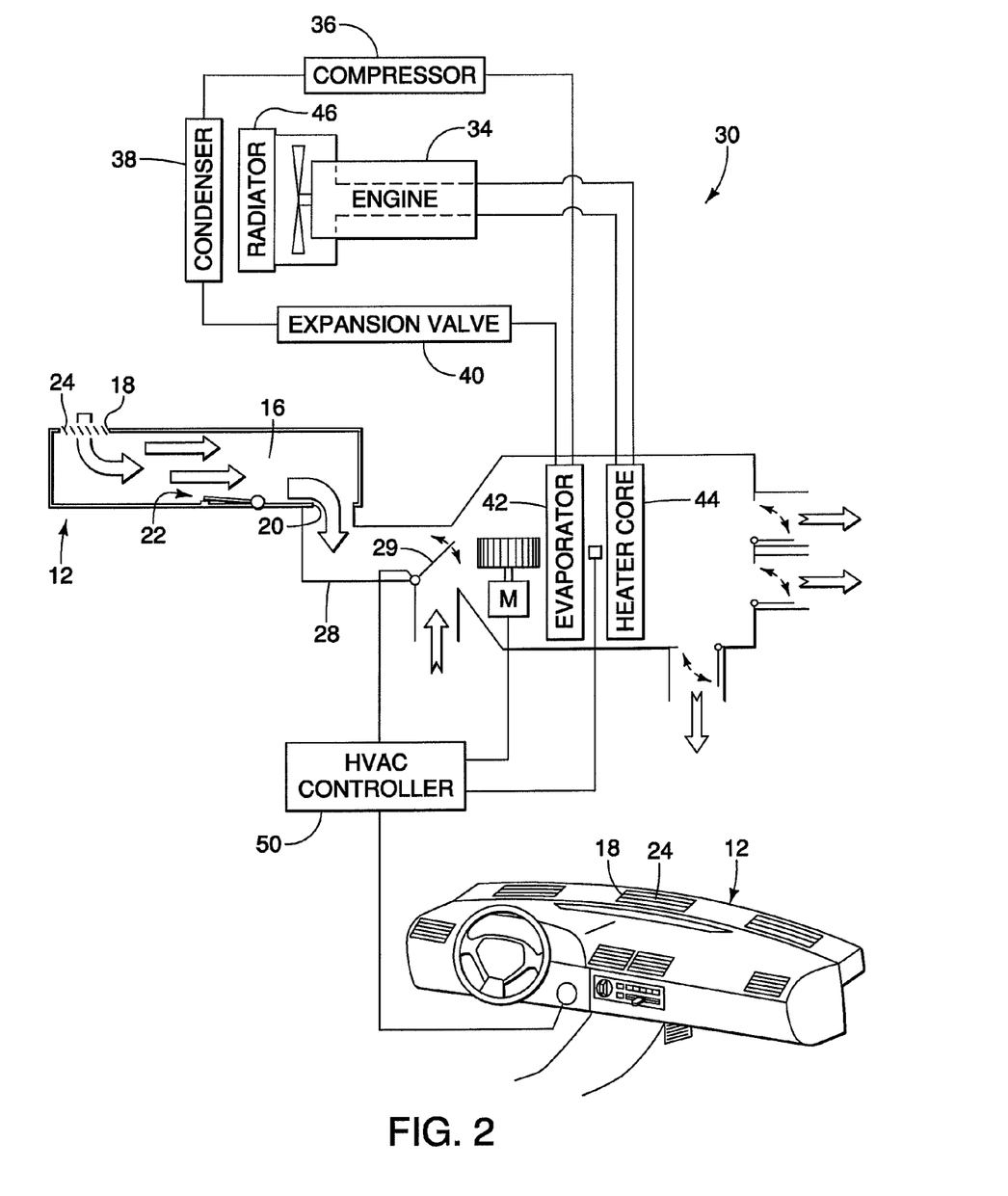
FIG. 2 is a diagrammatic view of the cowl box structure with a dynamic flow restriction device in accordance with a first embodiment that is used in conjunction with an HVAC system of the vehicle illustrated in FIG. 1.

Referring initially to FIG. 1, a vehicle 10 is illustrated with a cowl box structure 12 in accordance with a first embodiment. As seen in FIG. 2, the cowl box structure 12 is diagrammatically illustrated, and basically includes an air passageway 16, an air inlet 18, an air outlet 20 and a dynamic flow restriction device 22. The air inlet 18 is arranged to receive outside air, and typically includes louvers 24. The air passageway 16 extends between the air inlet 18 and the air outlet 20 to convey the outside air from the air inlet 18 to the air outlet 20. Thus, the air drawn into the cowl box structure 12 exits the cowl box structure 12 through the air outlet 20. The air outlet 20 fluidly connected to ducting 28 of a vehicle HVAC system 30 for supplying the outside (fresh) air to the vehicle interior. The ducting 28 is also provided with a recirculation door or flap 29 for the outside blocking the outside (fresh) air from entering the vehicle interior.

The dynamic flow restriction device 22 is disposed in the air passageway 16 between the air inlet 18 and the air outlet 20 at a point upstream of the air outlet 20. Thus, all of the air entering the cowl box structure 12 passes the dynamic flow restriction device 22 before exiting through the air outlet 20. In this embodiment, the dynamic flow restriction device 22 is configured and arranged to automatically decrease airflow from the air inlet 18 to the air outlet 20 as the airflow through the air inlet 18 increases. In other words, the dynamic flow restriction device 22 is arranged in the cowl box structure 12 to automatically counter the "ram air effect" on the air inlet 18 of the cowl box structure 12 due to the increasing airflow volume occurring at increasing vehicle speeds. Thus, the dynamic flow restriction device 22 is arranged in the cowl box structure 12 to automatically modulate inlet airflow volume to HVAC system based upon airflow volume flowing into the air inlet 18 of the cowl box structure 12.

Referring initially to FIG. 2, an overall schematic diagram of a vehicle air recirculation system is illustrated in which the cowl box structure 12 is installed in accordance with one embodiment. Basically, the main components relating to the vehicle air recirculation system includes, among other things, an engine 34, a compressor 36, a condenser 38, an expansion valve or orifice 40, an evaporator 42, a heater core 44 and a radiator 46. The components 34, 36, 38, 40, 42, 44 and 46 constitute a refrigerant circuit for the air conditioner of the vehicle 10. The engine 34, the heater core 44 and the radiator 46 constitutes a heater circuit for the heater of the vehicle 10. These components 34, 36, 38, 40, 42, 44 and 46 are conventional components that are well known in vehicles. Since these components 34, 36, 38, 40, 42, 44 and 46 are well known, the structures of the components 34, 36, 38, 40, 42, 44 and 46 will not be discussed or illustrated in detail herein. This HVAC system does not include automatic variable blower control (VBC).

The exact shape of the cowl box structure 12 will vary based on the configuration (e.g., make and model) of the vehicle 10. Thus, the overall shape of the cowl box structure 12 will only be diagrammatically illustrated herein.

In this embodiment, the dynamic flow restriction device 22 includes at least one moveable flap 31, a pivot shaft 32 and a biasing member 33. Basically, in a free state with no ram air effect (zero vehicle velocity), the dynamic flow restriction device 22 will add no restriction to inlet airflow from the air inlet 18 to the air outlet 20. This "no added restriction condition" will apply until a minimum defined threshold ram air flow volume is reached, and above which, the dynamic flow restriction device 22 begins to be deployed. Deployment onset and rate are controlled by calibrating the biasing member 33 (e.g., the tension coil spring), based on vehicle or subsystem testing to optimize intended HVAC system airflow and minimize undesirable impact of "ram air effect".

Figure 3:
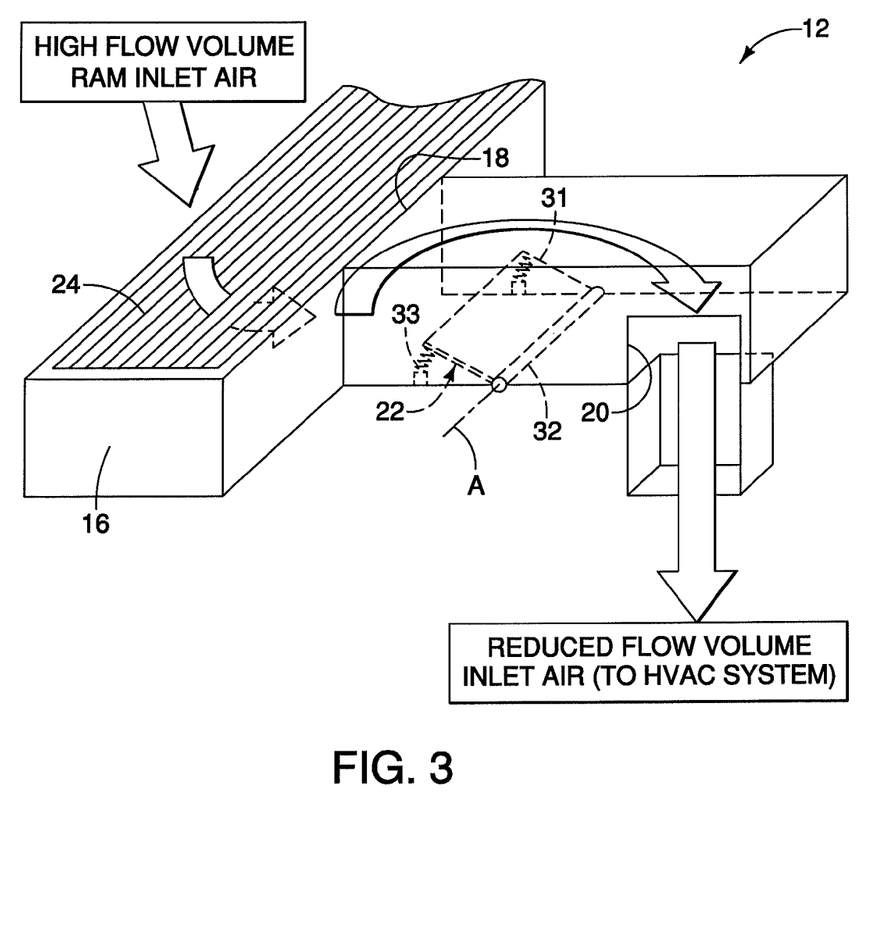
FIG. 3 is a diagrammatic perspective view of the cowl box structure illustrated in FIG. 2 with the dynamic flow restriction device in accordance with the first embodiment.
Figure 4:
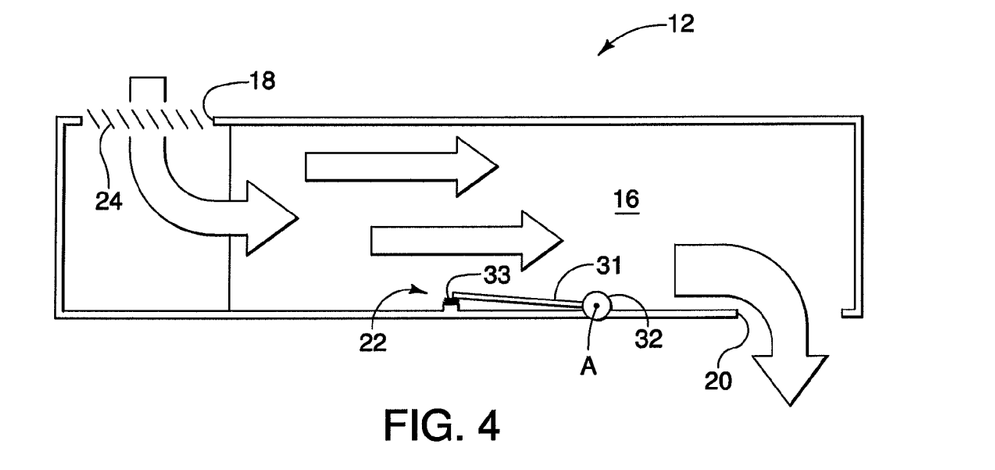
FIG. 4 is a diagrammatic view of the cowl box structure illustrated in FIGS. 2 and 3 in accordance with the first embodiment showing no air restriction of the passageway of the cowl box by the dynamic flow restriction device.
Figure 5:
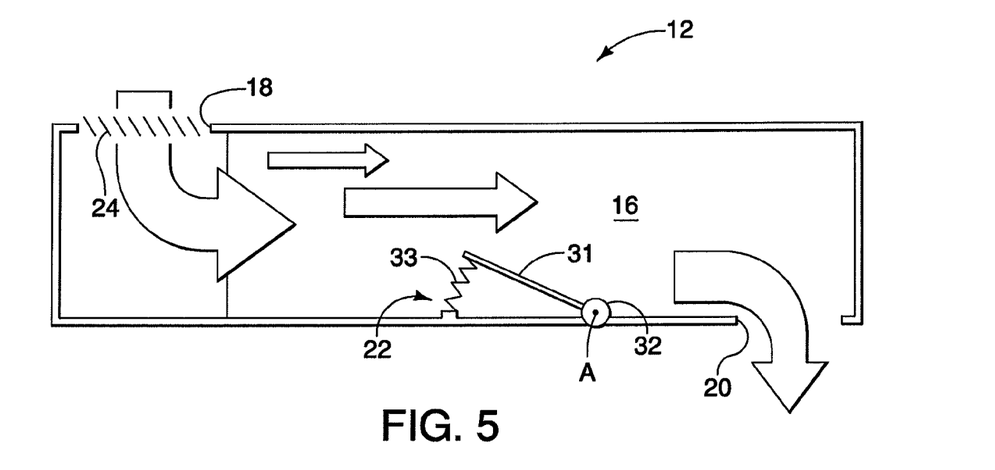
FIG. 5 is a diagrammatic view of the cowl box structure illustrated in FIGS. 2 and 3 in accordance with the first embodiment showing a partial air restriction of the passageway of the cowl box by the dynamic flow restriction device.

Referring now to FIGS. 3 to 5, the cowl box structure 12 is diagrammatically illustrated in accordance with the first embodiment. In this embodiment, the flap 31 is pivotally mounted about a pivot axis A by the pivot shaft 32, which is formed at a first end of the flap 31. While only one flap is illustrated herein, it will be apparent from this disclosure that two or more moveable flaps of various shapes and sizes can be attached to the wall of the cowl box structure 12 to add restriction to inlet ram airflow based upon influence of ram air flow acting on the cowl box structure 12. The biasing member 33 is fixed at one end to a second (free) end of the flap 31. The other end of the biasing member 33 is fixed to a side wall of the air passageway 16. In this embodiment, the biasing member 33 is a coil tension spring. In this embodiment, the pivot shaft 32 on the first end of the flap 31 is disposed at a location located adjacent a side wall of the air passageway 16. The flap 31 has a second end that is opposite the first end with the second end being spaced from the side wall of the air passageway 16 such that substantially all of the airflow passes over the second (free) end of the flap 31. In this embodiment, since the pivot shaft 32 on the first end of the flap 31 is disposed at a location located adjacent a side wall of the air passageway 16, substantially none of the airflow passes over (e.g., beneath in the illustrated embodiment) the first end of the flap 31.

As seen in FIGS. 4 and 5, the flap 31 pivots from a first or rest position (FIG. 4) towards a second or air blocking position (FIG. 5) as the airflow through the air inlet increases. The biasing member 33 biases the flap 31 towards the first position (FIG. 4). The flap 31 is inclined less with respect to a flow direction of the airflow in the first position than in the second position such that the effective cross sectional area of the air passageway 16 is larger in the first position than in the second position. Preferably, the flap 31 has a cross sectional area that is less than a cross sectional area of the air passageway 16 at the flap 31. Thus, the flap 31 is designed not to completely block air flow in any position, even if the biasing member 33 should break. This will ensure that the air flow can not be completely blocked by the flap 31.

In this embodiment, the dynamic flow restriction device 22 is a purely mechanical device that works solely due the force of the air flowing through the air passageway 16. In other words, no motors or electrical actuators are needed for the dynamic flow restriction device 22 to work. Moreover, the flap 31 automatically adjusts to the appropriate inclination based on the air flow rate thorough the air passageway 16 at the flap 31. No manual operations are necessary to change the air flow exiting the air outlet 20. As seen in FIGS. 4 and 5, the flap 31 moves from the first position (FIG. 4) towards the second position (FIG. 5) as the airflow through the air inlet increases such that an amount (volume) of the airflow to the air outlet decreases as the flap 31 moves farther from the first position towards the second position.

In particular, the biasing member 33 biases the flap 31 towards the first position (FIG. 4). However, when the air flow rate in the air passageway 16 increases beyond a prescribed threshold amount, the force from the air flowing rate through the air passageway 16 will overcome the biasing force of the biasing member 33 to cause the biasing member 33 to stretch and the flap 31 to pivot about the pivot axis A. In other words, the flap 31 is arranged such that the airflow applies a force to the flap 31 to move from the first position (FIG. 4) towards the second position (FIG. 5) against a prescribed urging force of the biasing member 33.

This pivotal movement of the flap 31 from the first position (FIG. 4) decreases the effective cross sectional area of the air passageway 16 and reduces the airflow out of the air outlet 20. As the air flowing rate through the air passageway 16 becomes greater, the effective cross sectional area of the air passageway 16 becomes smaller due to the pivotal movement of the flap 31. Accordingly, the flap 31 decreases the effective cross sectional area of the air passageway 16 as the vehicle speed increases.

Figure 6:
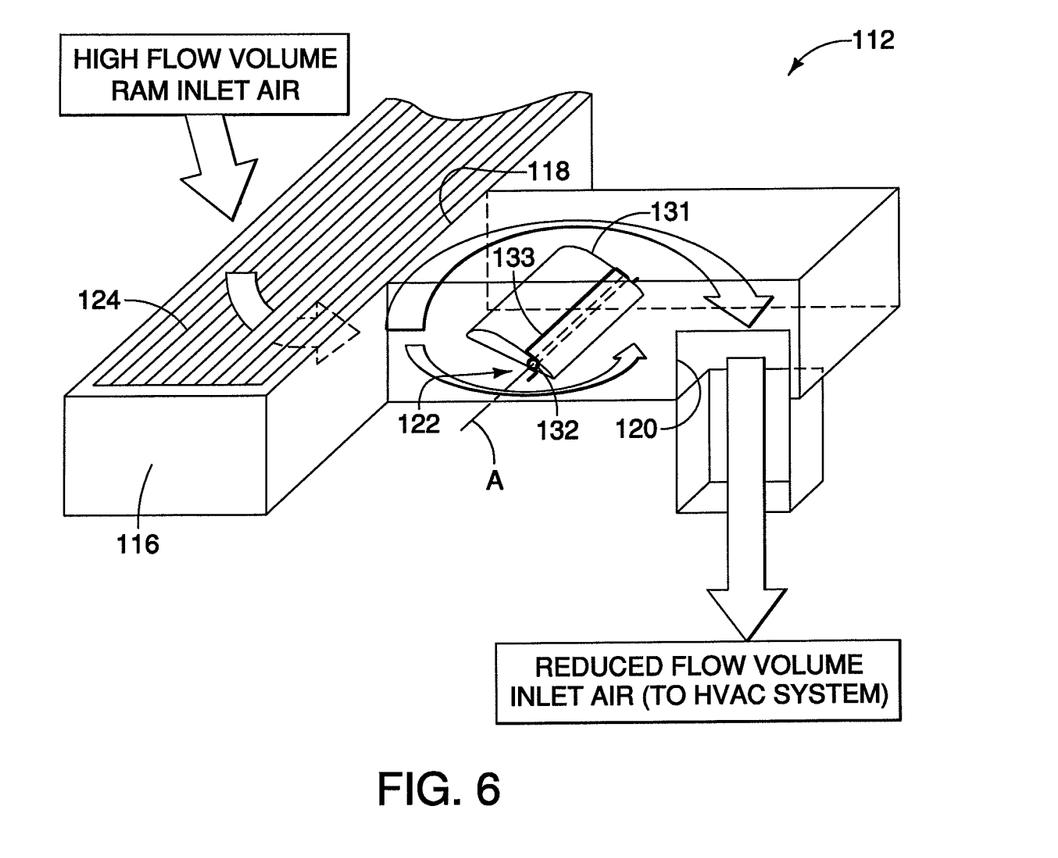
FIG. 6 is a diagrammatic perspective view of the cowl box structure with a dynamic flow restriction device in accordance with a second embodiment.
Figure 7:
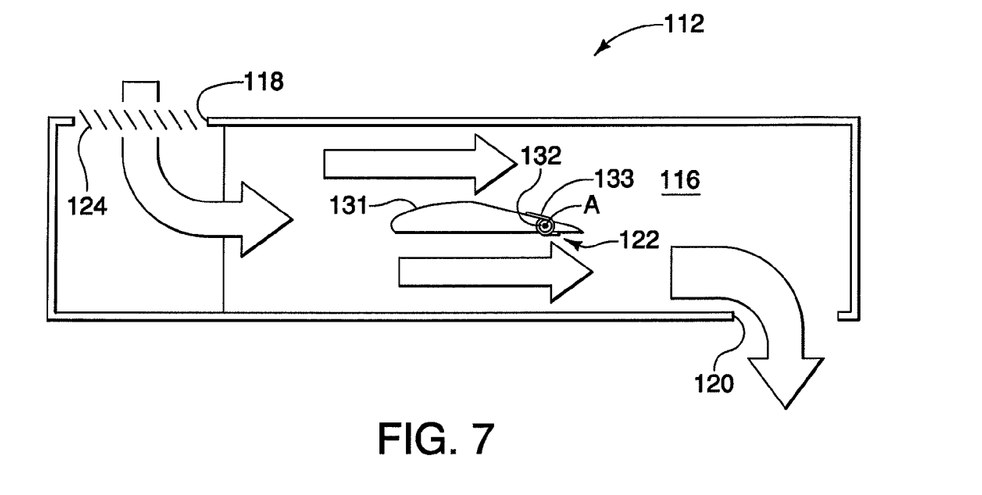
FIG. 7 is a diagrammatic view of the cowl box structure illustrated in FIGS. 2 and 3 in accordance with the second embodiment showing no air restriction of the passageway of the cowl box by the dynamic flow restriction device.
Figure 8:
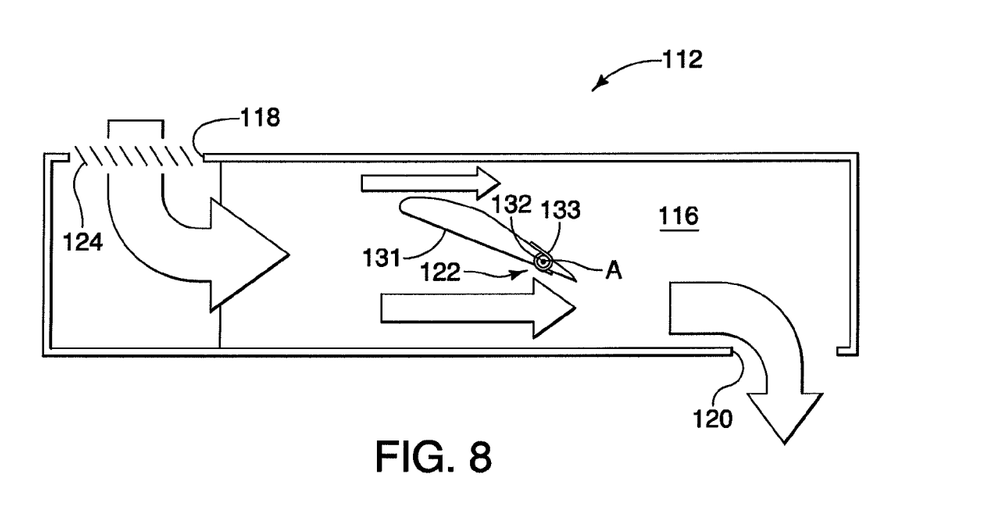
FIG. 8 is a diagrammatic view of the cowl box structure illustrated in FIGS. 2 and 3 in accordance with the second embodiment showing a partial air restriction of the passageway of the cowl box by the dynamic flow restriction device.

Referring now to FIGS. 6 to 8, a cowl box structure 112 is diagrammatically illustrated in accordance with a second embodiment. In view of the similarity between the first and second embodiments, the descriptions of the parts of the second embodiment that are identical to the parts of the first embodiment may be omitted for the sake of brevity.

The cowl box structure 112 basically includes an air passageway 116, an air inlet 118, an air outlet 120 and a dynamic flow restriction device 122. The cowl box structure 112 is the same as the cowl box structure 12 of the first embodiment, but for the dynamic flow restriction device 122. Thus, the cowl box structure 112 is used in the HVAC system 30 shown in FIG. 2 by replacing the cowl box structure 12 in FIG. 2 with the cowl box structure 112 in FIGS. 6 to 8.

In this embodiment, the dynamic flow restriction device 122 includes at least one moveable flap 131, a pivot shaft 132 and a biasing member 133. The flap 131 has an airfoil-shape with upper and lower surfaces shaped such that the airflow causes the flap 131 to move from a first or rest position (FIG. 7) towards the second or air blocking position (FIG. 8) as the airflow increases. In other words, the flap 131 has a curved top surface and a flat bottom surface such that the air follows a longer path above the flap 131 than below the flap 131. Since the upper surface of the flap 131 is longer, it causes the air to flow faster over the upper surface, which (by Bernoulli's principle) creates lower pressure above the flap 131. Thus, as the air flow rate increases, the flap 131 is pivoted so that the leading edge of the flap 131 moves upwardly to reduce the effective cross section of the air passageway 116.

Basically, in a free state with no ram air effect (zero vehicle velocity), the dynamic flow restriction device 122 will add no restriction to inlet airflow from the air inlet 118 to the air outlet 120. This "no added restriction condition" will apply until a minimum defined threshold ram air flow volume is reached, and above which, the dynamic flow restriction device 122 begins to be deployed. Similar to the first embodiment, deployment onset and rate are controlled by calibrating the biasing member 133 (e.g., the tension coil spring), based on vehicle or subsystem testing to optimize intended HVAC system airflow and minimize undesirable impact of "ram air effect". Also the deployment onset and rate can be controlled by the airfoil-shape of the flap 13 1.

Here, the flap 131 is pivotally mounted about the pivot axis A, which is disposed midway between a pair of opposite side walls of the air passageway 1 6 such that a first portion of the airflow passes over (e.g., beneath in the illustrated embodiment) a first end of the flap 131 and a second portion of the airflow passes over (e.g., above in the illustrated embodiment) a second end of the flap 13 1. The flap 131 is arranged with respect to the side walls of the air passageway 1 6 such that the first portion of the airflow passes over the first end of the flap 131 becomes smaller than the second portion of the airflow passes over a second end of the flap 131 as the flap 131 moves from the first or rest position (FIG. 7) towards the second or air blocking position (FIG. 8). In the first or rest position (FIG. 7), the airflow amount (volume) of the first and second portions of the airflow passes above and below the flap 131 is equal.

Preferably, the flap 131 is aligned with respect to the air flow path in the first or rest position (FIG. 7) and inclined less with respect to the air flow path in the second or air blocking position (FIG. 8). Preferably, the flap 131 is configured with respect to the side walls of the air passageway 116 at the flap 3 1 such the air flow can not be completely blocked by the flap 131 in any position. Thus, if the flap 131 should get stuck, the flap 131 would not completely block air flow. This will ensure that the air flow can not be completely blocked by the flap 131.

In this embodiment, the dynamic flow restriction device 122 is a purely mechanical device that works solely due the force of the air flowing through the air passageway 116. In other words, no motors or electrical actuators are needed for the dynamic flow restriction device 122 to work. Moreover, the flap 131 automatically adjusts to the appropriate inclination based on the air flow rate thorough the air passageway 1 6 at the flap 13 1. No manual operations are necessary to change the air flow exiting the air outlet 120. As seen in FIGS. 7 and 8, the flap 131 moves from the first position (FIG. 7) towards the second position (FIG. 8) as the airflow through the air inlet increases such that an amount (volume) of the airflow to the air outlet decreases as the flap 131 moves farther from the first position towards the second position.

Figure 9:
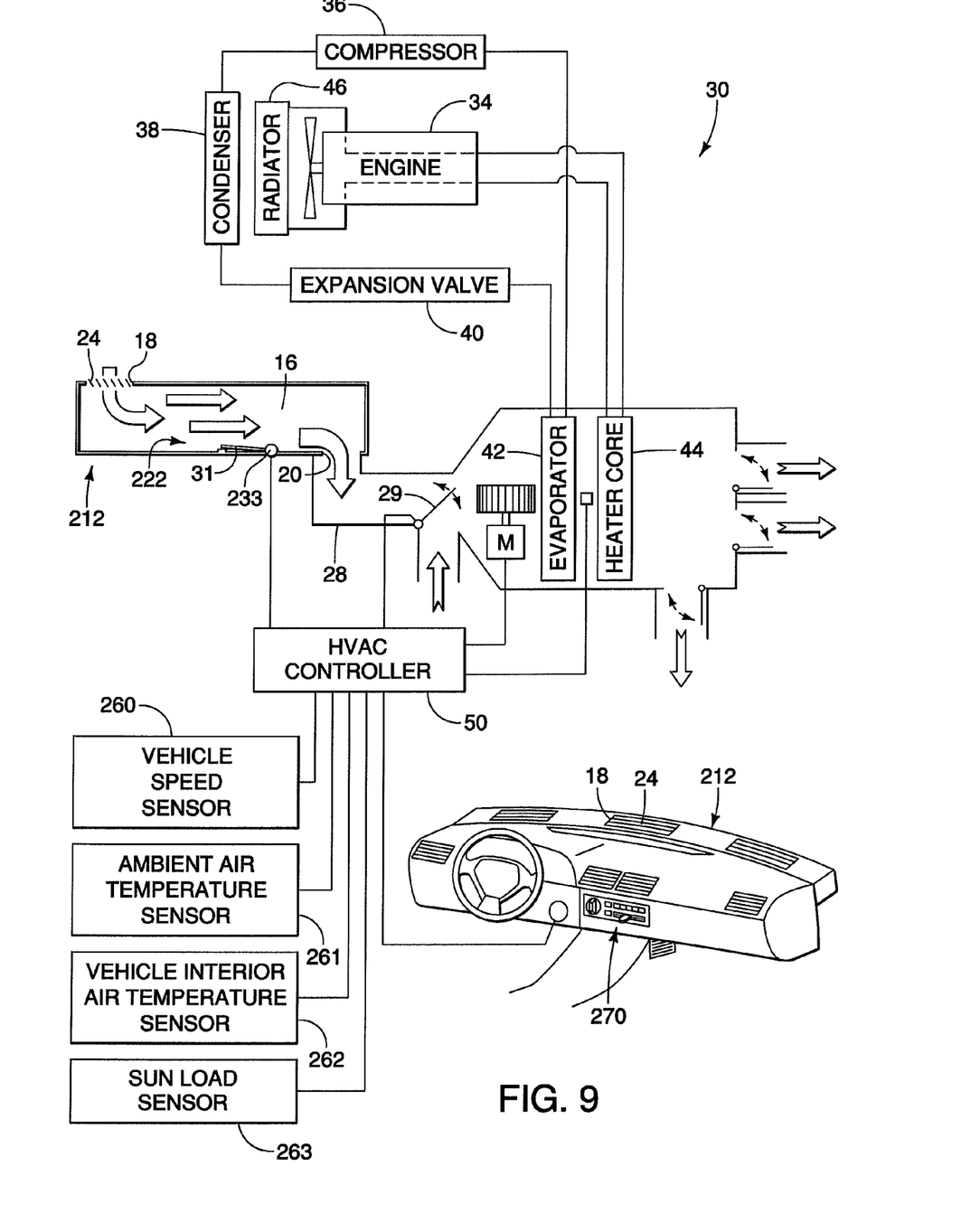
FIG. 9 is a diagrammatic view of the cowl box structure with a flow restriction device in accordance with a third embodiment.

Referring now to FIG. 9, a cowl box structure 212 is diagrammatically illustrated in accordance with a third embodiment. The cowl box structure 212 is identical to the cowl box structure 12, except that the biasing member 33 has been replaced with a dynamic flow restriction device 222 that has a feedback controlled actuator 233 attached to the pivot shaft of the flap 31. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In this embodiment, the feedback controlled actuator 233 of the dynamic flow restriction device 222 moves the flap 31 between the first and second positions based on a feedback control signal from the HVAC controller 50. The HVAC controller 50 receives signals from a vehicle speed sensor 260, an ambient air temperature sensor 261, a vehicle interior air temperature sensor 262 and a sun load sensor 263. In the case of the automatic HVAC system 30, once the passenger operates one of the controls 270 to set the vehicle cabin temperature, control signals are sent by the HVAC controller 50 to regulate the vehicle cabin temperature to match the temperature setting. After a vehicle cabin temperature is set, the HVAC controller 50 determines the amount that the flap 31 needs to be moved reduce the "ram air effect" of the ram inlet air. Thus, the feedback controlled actuator 233 is at least partially controlled based on one or more of the vehicle speed, the ambient air temperature around the vehicle, the vehicle cabin temperature, the sun load on the vehicle cabin and a vehicle cabin temperature setting of the vehicle HVAC system 30.

The dynamic flow restriction device 222 is more costly than using a fixed calibrated spring as discussed above, but may still be less costly than adopting a VBC. In addition, the dynamic flow restriction device 222 allows more flexible use of variable cowl restriction for AC system calibration, and can restrict flow over a greater range of system airflow settings without sacrificing HVAC system airflow at high blower settings.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," g"portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle cowl box structure comprising:
an air inlet arranged to receive outside air;
an air outlet arranged to convey the outside air to a vehicle HVAC system;
an air passageway extending between the air inlet and the air outlet to convey the outside air from the air inlet to the air outlet, the air passageway having a first side wall and a second side wall opposite the first side wall; and
a flow restriction device disposed in the air passageway at a point between the air inlet and the air outlet, the flow restriction device being configured and arranged to automatically decrease airflow from the air inlet to the air outlet as the airflow through the air inlet increases,
the flow restriction device including at least one moveable flap pivotally mounted about a pivot axis midway between the first and second side walls, the flap having a first end and a second end, the flap moving from a first position towards a second position as the airflow through the air inlet increases such that an amount of the airflow to the air outlet decreases as the flap moves farther from the first position towards the second position, the flap having an airfoil-shape with upper and lower surfaces shaped such that the airflow causes the flap to move from the first position towards the second position as the airflow increases such that a first portion of the airflow passes over the flap and a second portion of the airflow passes under the flap, the first position corresponding to the flap being positioned with little or no blockage of the air passageway and the second position corresponding to the flap being positioned for maximum blockage of the air passageway, the second end moving away from the first side wall and toward the second side wall during movement from the first position to the second position, the second end being spaced apart from the second side wall with the flap in the second position such that the second end is always spaced apart from the second side wall.

2. The vehicle cowl box structure according to claim 1, wherein
the flap is pivotally mounted about the pivot axis at the first end of the flap, and the second end of the flap being opposite the first end with the second end being spaced from the second side wall of the air passageway.

3. The vehicle cowl box structure according to claim 1, wherein
the flap is inclined less with respect to a flow direction of the airflow in the first position than in the second position.

4. The vehicle cowl box structure according to claim 1, wherein
the flap has a cross sectional area that is less than a cross sectional area of the air passageway at the flap.

5. The vehicle cowl box structure according to claim 1, wherein
the flow restriction device includes a biasing member that biases the flap towards the first position, and the flap being further arranged such that the airflow applies a force to the flap to move from the first position towards the second position against a prescribed urging force of the biasing member.

6. The vehicle cowl box structure according to claim 1, wherein
the flap is arranged with respect to the side walls of the air passageway such that the first portion of the airflow passing over the flap is smaller than the second portion of the airflow passing under the flap.

7. The vehicle cowl box structure according to claim 1, wherein
the flow restriction device includes a feedback controlled actuator which moves the flap between the first and second positions based on a feedback control signal from an HVAC controller.

8. The vehicle cowl box structure according to claim 7, wherein
the feedback controlled actuator is at least partially controlled based on vehicle speed.

9. The vehicle cowl box structure according to claim 7, wherein
the feedback controlled actuator is at least partially controlled based on vehicle cabin temperature and a vehicle cabin temperature setting of the vehicle HVAC system.

10. The vehicle cowl box structure according to claim 1, wherein
the air passageway is dimensioned such that air flows through the air passageway from the inlet toward the outlet in a first direction, and
the inlet is oriented relative to the air passageway such that air flows into the inlet in a second direction angularly offset from the first direction.

11. The vehicle cowl box structure according to claim 10, wherein
the second direction is perpendicular to the first direction.

12. The vehicle cowl box structure according to claim 10, wherein
the outlet is oriented relative to the air passageway such that air flows out the outlet in a third direction angularly offset from the first direction.

13. The vehicle cowl box structure according to claim 12, wherein
the third direction is perpendicular to the first direction.

14. The vehicle cowl box structure according to claim 1, wherein the outlet is formed in the first side wall of the air passageway.

15. The vehicle cowl box structure according to claim 14, wherein the inlet is formed in the second side wall of the air passageway.

* * * * *